United States Patent [19]

Roturier

[11] 4,181,458
[45] Jan. 1, 1980

[54] MULTIPLE-BROACH BROACHING MACHINE

[75] Inventor: Christian Roturier, Fontenay le Fleury, France

[73] Assignee: Regie Nationale des Usines Renault, Boulogne Billancourt, France

[21] Appl. No.: 910,540

[22] Filed: May 30, 1978

[30] Foreign Application Priority Data

Nov. 4, 1977 [FR] France .................. 77 33189

[51] Int. Cl.$^2$ .......................................... B23D 41/04
[52] U.S. Cl. .............................. 409/265; 409/266; 409/267
[58] Field of Search ...................... 90/92, 93, 91

[56] References Cited
U.S. PATENT DOCUMENTS

| 1,437,856 | 12/1922 | Myers | 90/92 |
| 2,212,737 | 8/1940 | Hart | 90/91 X |
| 3,087,389 | 4/1963 | Bonnafe | 90/92 X |
| 3,550,504 | 12/1970 | Fulks | 90/63 |

FOREIGN PATENT DOCUMENTS 396207  1/1974  U.S.S.R. .................. 90/93

Primary Examiner—William R. Briggs
Attorney, Agent, or Firm—Stevens, Davis, Miller & Mosher

[57] ABSTRACT

The invention relates to a multiple-broach broaching machine for broaching a pattern of holes formed in a workpiece. This machine comprises means for moving and positioning the workpieces on the broaching machine, means for pulling the broaches and means for following the broaches, said pull means and follower means co-acting with the opposite ends of the broaches, respectively, to ensure their passage through the holes of the workpieces to be broached from one side to the other side of the workpieces, said pull means and follower means being provided for two similar sets of broaches adapted to operate simultaneously in opposite directions. A handling device is associated with said sets of broaches on either side of the plane in which the workpieces are positioned, for the purpose of transferring each set of broaches, by turning same through 180°, from said pull means to the adjacent follower means at the end of each pass. Thus the broaches of each set operate by making successive working passes in opposite directions, the workpieces being simply repositioned in the gap between said passes according to the desired broaching action.

7 Claims, 15 Drawing Figures

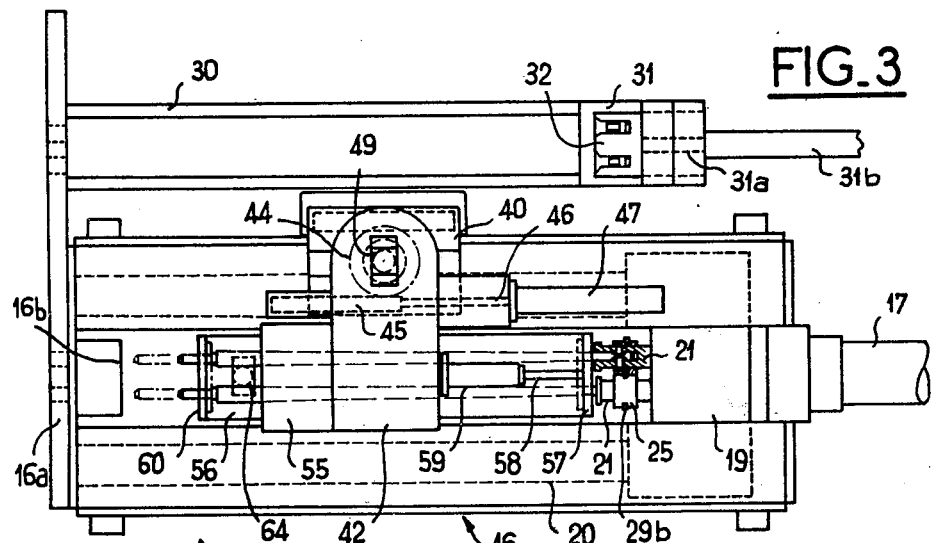
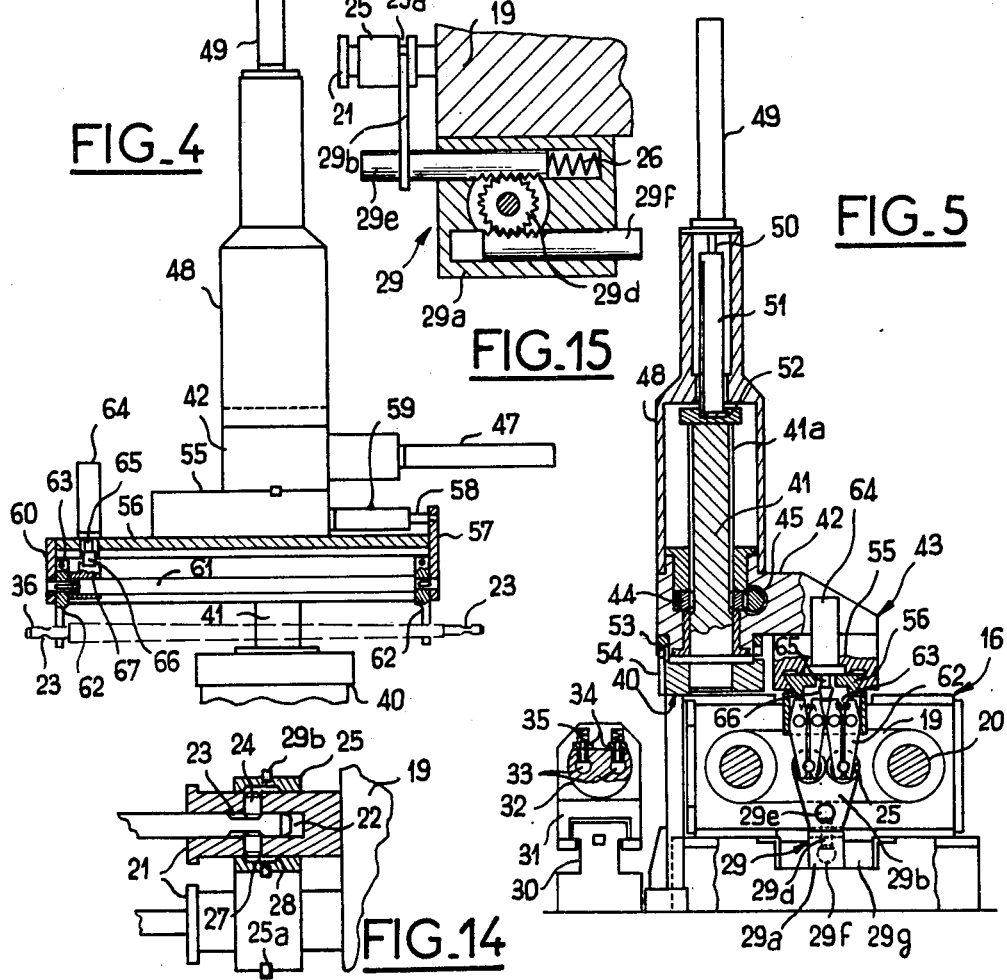

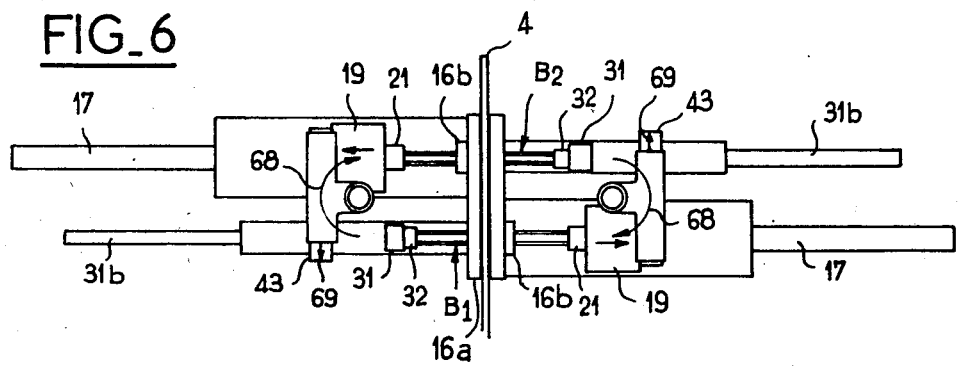
FIG_6
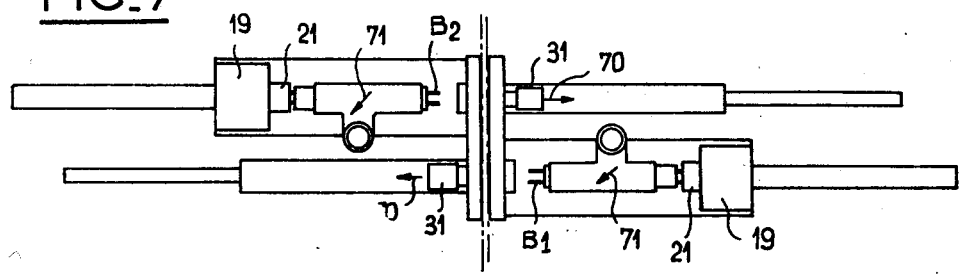
FIG_7
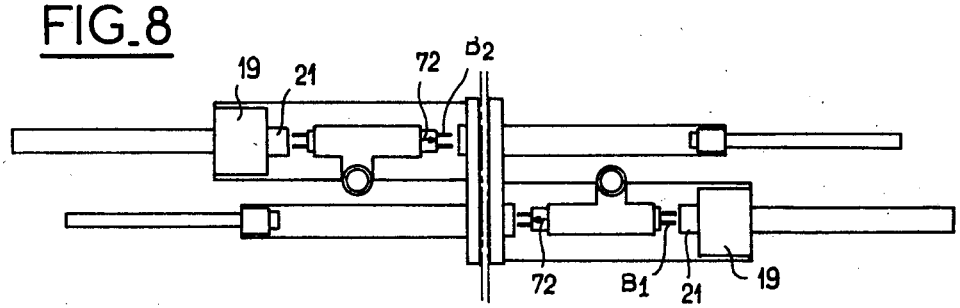
FIG_8
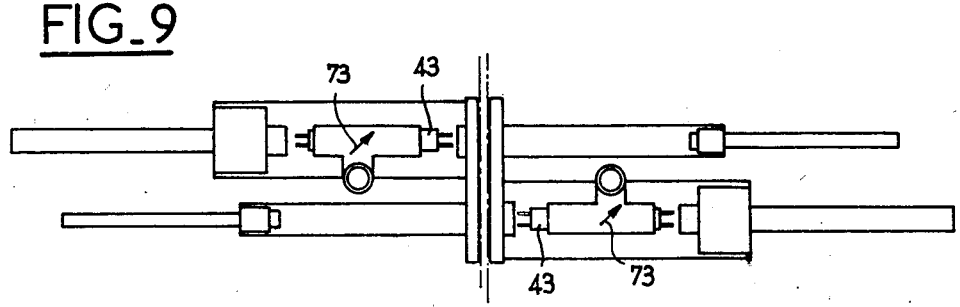
FIG_9

MULTIPLE-BROACH BROACHING MACHINE

This machine relates to multiple-broach broaching machines especially designed for broaching a regular pattern of holes in a plate, as in the case of cross-plates of heat exchangers, or more generally for the multiple and simultaneous broaching of workpieces in a mass-production process.

Pull-type broaching machines of this type are already known which comprise pull or traction means and other means for following or accompanying the broaches during their stroke, said means operating in conjunction with the opposite end portions of the broaches in order to cause them to pass through holes formed in the workpieces to be broached, from one face to the opposite face thereof.

With known broaching machines of this type operated for broaching holes, for example in a perforated plate or like workpiece, the latter must be retracted after each broaching pass and subsequently repositioning for the next pass. Now this handling is obviously detrimental to the production capacity of the machine.

It is the essential object of the present invention to provide an improved arrangement for a multiple-tool broaching machine which is directed to increase its production capacity while avoiding the above-mentioned inconvenience.

For this aim, the multiple-broach broaching machine according to the present invention, which is of the type broadly set forth hereinabove, is characterized in that the pull means and the follower means are provided for two similar groups of broaches adapted to operate simultaneously but in opposite directions, and that a handling device adapted to transfer each group of broaches from the pull means to the adjacent follower means while turning the group concerned through 180 degrees is associated with each group on either side of the workpiece positioning plane, so that the broaches of each group can perform successive passes in opposite directions, and that it is only necessary to reposition the workpieces according to the desired broaching operations during the gap separating said passes.

Of course, the workpiece handling device may be so constructed that is preserves the angular orientation of the broaches about their axes, if necessary, for example by using a clamp-type handling device of appropriate design.

The principles of the present invention are of course applicable to any type of internal broaching work involving any number of broaches in operation, with or without orienting the machining strokes, and even asymmetrically.

A typical form of embodiment of a broaching machine according to the present invention will now be described by way of example with reference to the accompanying drawings in which is diagrammatically shown a horizontal broaching machine.

In said drawings:

FIG. 3 is a plane view from above showing on a larger scale a broach handling device between the adjacent pull means and follower means of the two sets or group of broaches;

FIG. 4 is a side elevational view of the broach handling device of FIG. 3, as seen in the direction of the arrow IV, in another position of translation of the handling clamp;

FIG. 5 is a vertical section of the handling device of FIGS. 3 and 4, taken across the broaches;

FIGS. 6 to 13 are plane views illustrating the various stages of operations of the broach handling device at the end of a pass and before commencing the next pass;

FIG. 14 is a detail view of the pull locking heads; and,

FIG. 15 is a detail view of the pull locking head control mechanism.

Figure 1:
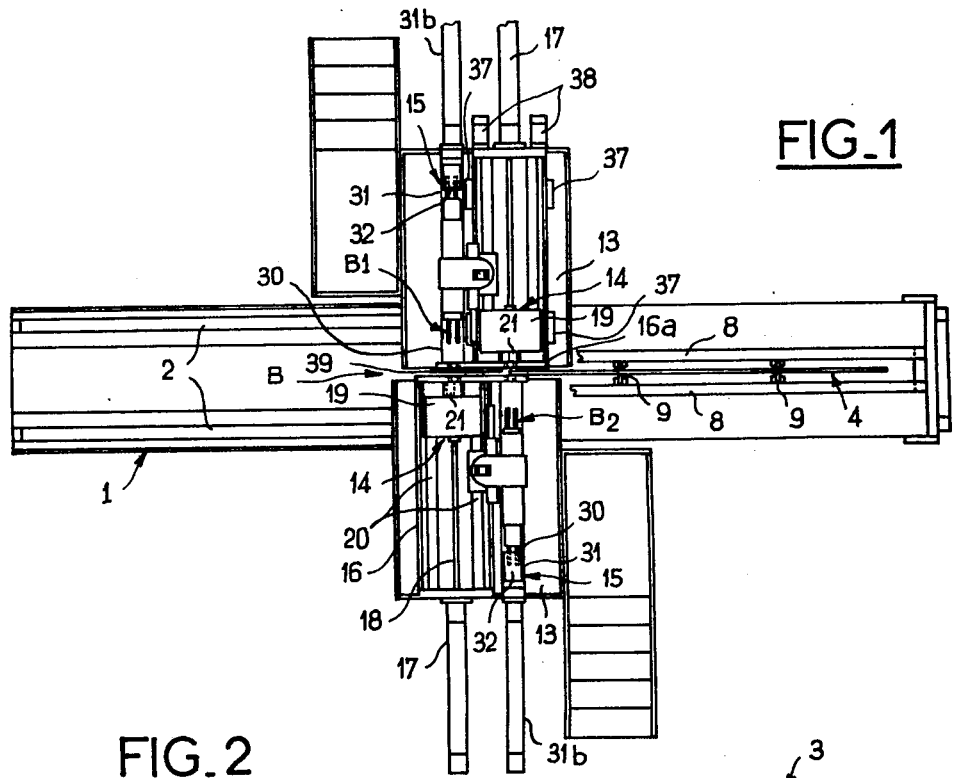
FIG. 1 is a plane view from above of the broaching machine.

The broaching machine illustrated comprises a lower structure constituting a tank 1 for recovering the cutting oil; at its upper portion, this structure comprises races 2 for a gantry 3 from which the workpiece can be suspended, this workpiece consisting for example of a plate 4 in which a regular pattern of multiple holes to be broached are formed, only one fraction of these holes being shown at 5.

This gantry 3 comprises a pair of electric pulley-blocks 6 adapted to be connected to the plate 4 and overlapping the latter by engaging a connecting rod 7 extending through one hole of said plate and corresponding lower eyelets of each suspension rope.

Furthermore, this gantry, just above the level of the broaching unit B to be described presently in detail, comprises a pair of longitudinal rails 8 between which the plate 4 is engaged, each rail 8 being provided with at least one pair of V-shaped blocks supporting pins 9 for locking at the selected level the plate 4 on the gantry by causing said pins to engage two holes of the appropriate row of holes formed in the plate 4, the end portions of each pin engaging the aforesaid V-shaped blocks.

The gantry 3 is movable along the races 2 on either side of the broaching unit B under the control of an electric motor shown only diagrammatically at 10 and driving a pinion 10a meshing with a toothed rack 10b secured to the lower structure of the gantry which rolls on the races 2 by means of wheels or rollers 11.

Figure 2:
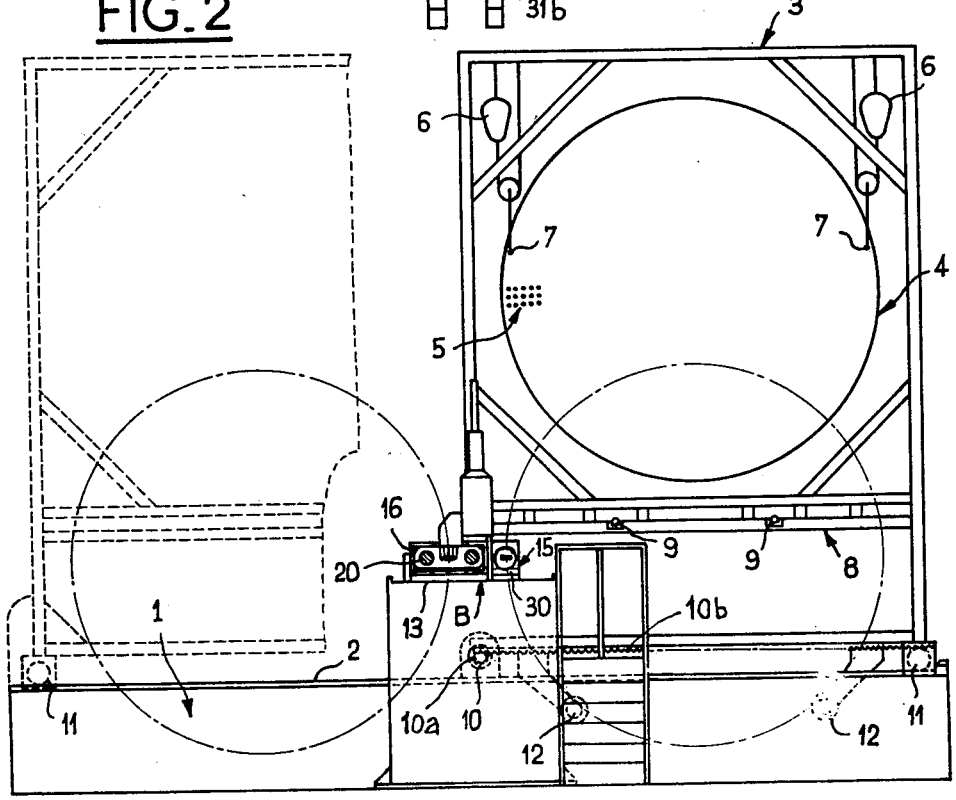
FIG. 2 is a side elevational and part-sectional view of the machine illustrated in FIG. 1, showing the handling device in a different position.

The broaching unit or station B comprises broaches disposed at a height such that they can broach at least the holes of the lower half of the plate 4 in its various vertical positions, a pair of rollers 12 being also provided under the gantry, one roller 12 being braked and the other power-driven, so that the plate 4 can be turned through an angle of 180°, when one-half of its surface has been broached, for changing the point of anchorage of the suspension ropes 7 of the pulley-blocks in order to permit the broaching of the other half of the plate surface. Of course, the races 2 engaged by the gantry wheels 11 are such that the longest horizontal row of holes in plate 4 can be moved horizontally with an amplitude sufficient to afford the broaching of the endmost holes, the limit end positions of the plate in the vertical and horizontal directions being shown in dash and dot lines in FIG. 2.

The broaching unit or station B comprises two tables 13 disposed on either side respectively of the plane in which the plate 4 is caused to move and supporting each, in side by side relationship, a pull device associated with a set of broaches B1 or B2 and a follower device 15 for the other set of broaches B2 or B1, each set comprising in this example two broaches; however, it is clear that this number is immaterial for the purposes of the present invention, provided that it is the same for both sets.

Each pull device 14 comprises a frame 16 supporting a hydraulic cylinder 17 of which the piston rod 18 is rigid with a pull block 19 slidably mounted on a pair of lateral slide rods 20 rigid with the frame 16.

On its front face, the pull block is provided with a pair of locking heads 21 adapted to lock the end portions of the broaches releasable engageably into said heads. Such locking heads are known per se and disclosed notably in the French C.N.O.M.O standards 26-55-50 and 51, and also in the German DIN 1418 standards. They comprise notably, as illustrated in FIGS. 3 and 14, a cavity 22 for receiving the end portion of the broach which is provided with a retaining groove 23 engageable by radial lock pins 24 mounted freely in a corresponding slot of said cavity 22 and surrounded by a push member 25 adapted to be actuated in the axial direction of said cavity. This push member 25 is formed with an internal cavity having end cam faces 28 formed therein for actuating the corresponding pins 24. Thus, according to the axial position of the push member in relation to the cavity, the end portion of the corresponding broach can be engaged, locked and then released.

In the example illustrated, the axial position of the pair of push members 25 is controlled at the end of the forward and backward strokes of pull block 19 by means of a device mounted in a block 29a secured to the bottom surface of the pull block (see FIGS. 5 and 15). This device 29 comprises a pair of forks 29b engaging each an external groove 25a formed in the relevant push member and operatively connected to a stop-rod 29e slidably mounted in a bore of block 29a in which this stop-rod 29e has a toothed-rack forming portion in constant meshing engagement with a pinion 29d rotatably mounted in said block 29a. Another stop-rod 29f in which rack teeth are cut is in constant meshing engagement with the same pinion 29d and slidably mounted in the block 29a. The first stop-rod 29e is normally urged forwards so as to protrude from the block 29a by a coil compression spring 26 and adapted to co-act with the front plate element of frame 16 at the end of the forward stroke of pull block 19 so as to cause the push members 25 to recede and compress the spring 26 (thus permitting the engagement of the broaches into the relevant locking heads 21) while the other stop-rod 29f normally protrudes from the back face of block 29a and is adapted, at the end of the backward stroke of pull block 19, to engage a stop plate 29g supported by the frame 16, thus causing at the same time the backward movement of push members 25 and compressing said spring 26 (for releasing the end portions of the broaches retained in the relevant locking heads 21).

Each follower device 15 comprises a rail 30 secured to the corresponding table and adapted to guide a follower block 31 provided on its front surface with a spring-loaded head 32 for locking the end portions of the broaches which are engageable therein. This head 32 comprises in this example, as illustrated in FIG. 5, a pair of cavities 33 for receiving the relevant end portion of the broach, in which a retaining groove 23 is formed and adapted to be engaged by a radial lock pin 34 responsive to a spring 35 normally urging same to its operative or locking position. This lock pin 34 may be retracted from the groove 23 by cam action exerted either by the frustoconical surface 36 formed on the broach end portion shown in FIG. 4 (for obtaining the locking action) or by the adjacent oblique lateral surface of groove 23 (for releasing the broach when the latter is extracted or moved back).

The follower block 31 is connected to the rod of a piston 31a of a fluid-operated actuator of which the cylinder 31b is secured to the end of rail 30.

In the case of an asymmetrical arrangement of the hole pattern in the plate to be broached, a broach locking head will be provided, this head being rotatably mounted so that the orientation corresponding to each face of the plate will be obtained automatically at each pass. This locking head rotation may be obtained by providing a socket in permanent screw engagement with the block and abutting at the end of the backward stroke of the follower movement in the proper angular position for receiving the broaches from the adjacent pull block, the reverse movement of rotation of this pull block being obtained, by providing a return spring in a predetermined angular position, from the very beginning of the feed movement of the follower block, in order to set the broach in the desired orientation for the next pass. Moreover, to facilitate the manual removal of the broaches, the retaining action of the locking pins may be suppressed by providing a lever operatively connected thereto.

The frame 16 of one of the pull devices 14 is mounted in a fixed position on the corresponding table 13 and the other frame is slidably mounted on its table by means of slideways 37 enabling this other frame to perform a predetermined stroke parallel to the pull stroke, two fluid-operated cylinders 38 being interposed between this sliding frame and the table so that the front plate 16a of the relevant frame 16 can be moved between an opening position (with respect to the front plate of the other fixed frame, thus permitting the easy engagement and actuation of the plate 4 to be broached therebetween) and a position in which said plate 4 is clamped between the two front plates of said frames preliminary to the broaching operation proper.

The accurate positioning of the plate 4 for the broaching operation may thus be obtained by means of taper-pointed centering studs 39 carried by the front plate of the sliding frame 16 and adapted to engage appropriate holes in plate 4 that are adjacent the holes to be broached. If desired, such centering studs 39 may also be of the retractable type operated by fluid under pressure, both on the fixed frame and on the sliding frame 16. These studs may also be used for checking the presence of solid or perforated plate areas. Several studs are required and in the various cases arising in actual practice the accurate positioning of the plate 4 is obtainable by properly combining the positions of said studs.

Of course, the front plates 16a of frames 16 are provided with holes permitting the passage of the two sets of broaches therethrough.

On each table 13 a handling device adapted at the end of each pass to transfer the set of broaches carried by the pull device 14 to the adjacent follower device 15 is mounted. Thus, as shown notably in FIGS. 3 to 5 of the drawings, each handling device comprises a base plate 40 for securing same to the table 13. This base plate 40 carries an upstanding fixed pintle 41 having rotatably mounted thereon a radial arm 42 from which a set of broaches shown generally at 43 can be suspended. The pintle 41 comprises a splined portion 41a having slidably mounted thereon and housed in a cylindrical cavity of the hub portion of said arm 42, a pinion 44 meshing with a toothed rack 45 slidably mounted in said arm and connected to the piston rod 46 of a fluid-operated cylinder 47 secured to the end portion of a tubular support rigid with said arm 42. Overlying the hub portion of said arm 42 and rigid therewith is a column 48 surrounding the pintle 41 and projecting from the upper end thereof; secured to the top portion of this column 48 is the cylinder 49 of a pressure-fluid operated actuator having its piston rod 50 connected to an intermediate shaft 51 engaging a cavity of a bearing cup 52 forming an insert on the top of said pintle 41.

From the foregoing it appears clearly that the actuator 46, 47 constitutes the hydraulic motor for driving the arm 42 during its pivotal movements (pinion 44 remaining stationary), and that the other actuator 49, 50 constitutes the hydraulic motor controlling the vertical movements of this arm 42 and therefore of the clamp 43. In its lowermost position shown in FIG. 5, the arm 42 is positioned angularly with precision by causing a stop rider 53 (this arm carrying two such diametrally-opposed stop riders) to engage a notch 54 for preventing its rotation, this notch being formed in an insert secured to the base plate 40.

The handling clamp 43 comprises a support 55 secured under the arm 42 and having slidably mounted thereon through dovetail-sectioned guide means a clamp body 56. The latter carries an end plate 57 connected to the piston rod 58 of a pressure-fluid cylinder 59 secured to the aforesaid support 55, whereby this cylinder allows a movement of translation of the clamp body 56 in a direction parallel to the broach axis. The clamp body further carries four parallel rods 61 rotatably mounted between the end plate 57 and another end plate 60, said rods 61 having keyed thereon the clamp jaws 62 and being associated by pairs so that each one of the two broaches of one or the other set B1 or B2 can be gripped thereby.

These jaws 62 are normally urged by pairs to their closed position by a compression spring 63 interposed between their arms extending beyond their pivot rods 61, respectively. These jaws may be actuated to their open position by means of a fluid-pressure cylinder 64 secured to the clamp body 56 and having its piston rod 65 provided with a cam 66 adapted to co-act with a pair of levers 67 for controlling the adjacent arms of each pair of jaws which are keyed on the two central pivot rods 61 thereof. These clamp jaws may if desired be so arranged as to maintain the angular orientation of the broaches about their axes by providing a corresponding shape engagement between the jaws and the broaches.

The mode of operation of this broaching machine will now be described with the assumption that the plate 4 to be broached is already positioned in the above-described manner and ready for a broaching cycle.

This broaching cycle starts from an initial condition in which both sets of broaches B1 and B2 are retained in the spring-loaded locking heads 32 of follower blocks 31, respectively, as illustrated notably in FIG. 1.

By supplying fluid under pressure to both cylinders 31b simultaneously, the follower blocks 31 cause the free ends of the sets of broaches B1 and B2 to be fed through the holes to be broached in plate 4 until said broaches engage the locking heads 21 of the corresponding pull blocks 19 which are then stopped by stop blocks 16b rigid with the front plates of frames 16, while the rods 29e bearing against said front plates, through the backward movement of push members 25, allow the free penetration of the broaches into the receiving cavities 22 of heads 21 of said pull blocks. From this position, during the movement of the follower devices, the cylinders 17 of both pull devices 14 are fed with fluid under pressure to pull the two sets of broaches B1 and B2 with the requisite power through the holes to be broached, after their initial strokes have caused firstly the release of push members 25 which, being responsive to their springs 26, assume the position corresponding to the locking of pins 24 in the retaining grooves 23 of said broaches, the follower devices still continuing to hold and accompany the broaches at their opposite ends. This broaching phase is illustrated in FIG. 6 wherein the pull blocks 19 pull the broaches in the direction of the arrows and the broach handling devices (of which the handling clamps 43 is initially in an upper position overlying the broaches), during the broaching operation proper, are caused to pivot through 180° (shown by the arrows 68) by the action of actuator 46, 47 and to perform a movement of translation (shown by the arrows 69), due to the action of actuator 58, 59.

FIG. 7 illustrates the position of the various devices at the end of the broaching stroke, with the pull blocks 19 still retaining the broaches in their locking heads 21, the follower blocks 31 having released said broaches at the end of the working stroke by forced disengagement (due to the tractive effort) of the spring-loaded lock pins 34 of locking heads 32, said blocks 31 being returned to their initial position in the direction of the arrows 70. The broach handling devices thus complete their movements shown by the arrows 68, 69 (FIG. 6) and each handling clamp 43 is the lowered (due to the action of actuator 49, 50) to the broach gripping position, obtained by the forced opening, against the force of springs 63, of the jaws of clamps 62 of which the end portions are formed for this purpose with divergent broach engaging beaks. This downward movement of each broach gripping clamp is illustrated diagrammatically by the arrow 71.

It will also be seen that at the end of the backward stroke of pull blocks 19 the rear abutment rod 29f of each block engages its relevant stop plate 29g, thus causing the push members 25 to recede and releasing the end portions of the broaches so that the latter are now supported only in the locking heads 21.

FIG. 8 illustrates the next stage of the handling, which consists in extracting the broaches from the pull blocks 19 by causing the movement of translation of each handling clamp 43 under the control of actuator 58, 59 (arrows 72).

Figure 10:
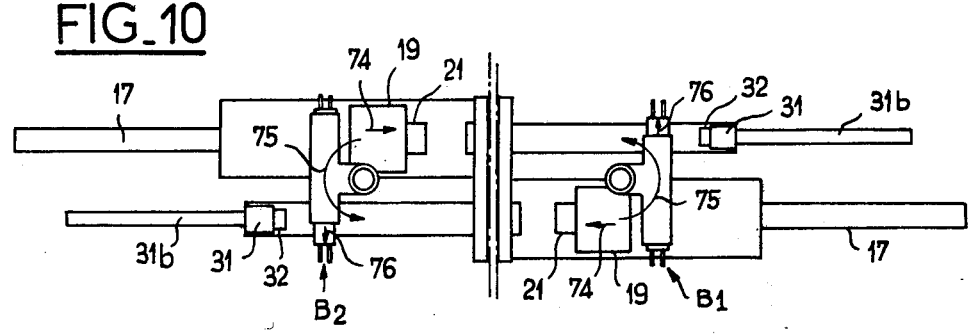
Figure 11:
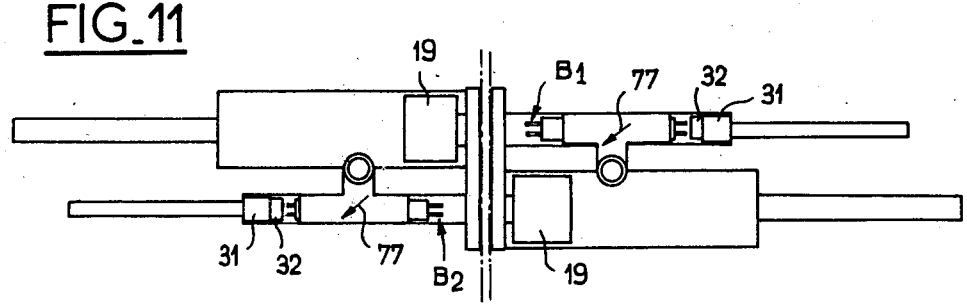

The next stage illustrated in FIG. 9 consists in lifting each handling clamp 43 supporting a set of broaches (through the action of actuator 49, 50 in the direction of the arrow 73). This upward movement takes place before the next stage shown in FIG. 10, wherein:

the pull blocks 19 are returned to their front abutting position for engagement with the front plate stop blocks 16a under the control of the relevant actuator 17 (see arrow 74);

each handling device accomplishes a half turn or 180° rotation shown by the arrow 75 (due to the action of actuator 46, 47) while the handling clamp 43 performs a movement of translation shown by the arrow 76 (due to the action of actuator 58, 59), so that the assembly assumes the position shown in FIG. 11, which leads to the downward movement of the handling devices as shown by the arrow 77 (due to the action of actuator 49, 50), thus causing the broaches to register with the locking heads of each follower block 31 adjacent the pull block 19 having just pulled said broaches through the plate 4 to be broached; in this case, the consequence of the 180-degree broach-handling rotation causes the broaches to resume their normal working direction, i.e. with their end portions to be pulled facing the pull block to which they are to be transferred.

Figure 12:
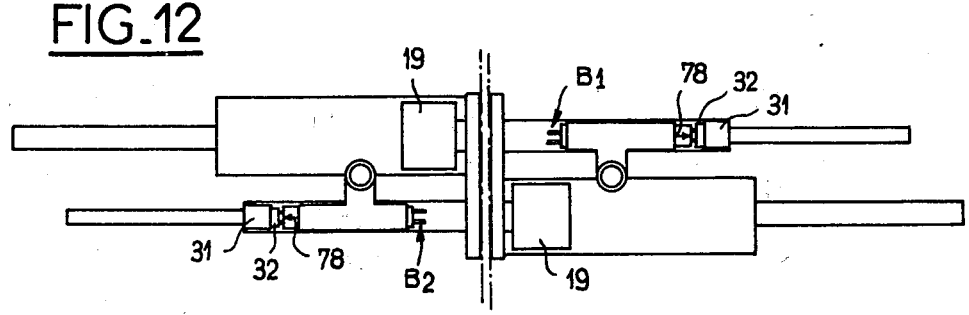
Figure 13:
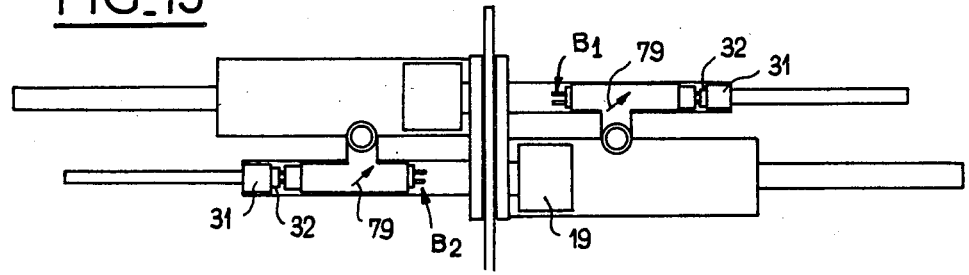

FIG. 12 illustrates the final phase of this transfer of the broaches to the follower blocks 31 which takes place by causing each handling clamp 43 to perform a movement of translation in the direction of the arrow 78 (due to the action of actuator 58, 59) so that the broaches are again locked in the spring-loaded locking heads 34 of each block 31, this transfer phase terminating as illustrated in FIG. 13 by the upward movement of the handling devices as shown by the arrows 79 (due to the action of actuators 49, 50). This final condition corresponds to the initial conditions defined in the foregoing at the beginning of a broaching cycle, and it will be seen that this broach handling operation takes place at the same time as the repositioning of the plate 4 to be broached, at the end of each pass, this re-positioning being limited to the mere movement consisting in bringing the next series of holes to be broached in proper registration with the broaches, whereas the broaching machine can thus perform successive working passes in the opposite direction with the two sets of broaches implemented, thus affording a production capacity that will be much appreciated by those conversant with the art.

Of course, many modifications and changes may be brought to the form of embodiment described and illustrated herein, notably in connection with the handling device, without departing inasmuch from the basic principles of the invention.

What is claimed as new is:

1. Multiple-broach broaching machine for broaching a pattern of holes in a workpiece comprising at least two pairs of broaches, means coacting with the opposite ends of one of the pairs of broaches for pulling and following that pair from a first starting position through the plane of the workpiece to be broached to a first end position; similar means coacting with the opposite ends of the other of said pairs of broaches for simultaneously pulling and following said second pair of broaches from a second starting position on the opposite side of said workpiece plane from said first starting position through the workpiece to be broached to a second end position, means for gripping each pair of broaches at its respective end position and for transferring said pair end for end to the first starting position of the other pair one pulling, one following means and one of said gripping and transferring means lying in each side of said workpiece plane whereby the broaches of each pair operate by making successive working passes in opposite directions, the workpieces being simultaneously repositionable in the time gap between successive operations of said broaches according to the desired broaching action.

2. Multiple-broach broaching machine according to claim 1, wherein the stroke of the pull means is from a front abutting to a back abutting position, locking heads adapted to release the broaches through spring-loaded push members when said pull means are in their front abutting position, this machine further comprising means for controlling said spring-loaded push members in the back abutting position of said pull means.

3. Multiple-broach broaching machine according to claim 1, wherein each broach gripping means is rotated through 180 degrees about an axis disposed between and normal to the two pairs of broaches and comprises a clamp for gripping the broaches of the pair concerned, said clamp being retractable with respect to the broaches in the broaching position and adapted to be translated towards the axis of the broaches for releasing same from said pull means and engaging said broaches into the follower means during their transfer.

4. Multiple-broach broaching machine according to claim 1, wherein the gripping clamp comprises jaws having an operative, broach-engaging portion matching the external configuration of the broaches for the purpose of preserving their angular orientation about their axis during their transfer.

5. Multiple-broach broaching machine according to claim 4 for performing broaching operations of different angular orientations as a function of the direction of the working passes of the broaches, wherein said follower means comprise locking heads incorporating spring-loaded pins adapted to engage the ends of said broaches, said head being operatively connected by screw means to said follower means and co-acting with stop means at the end of the backward stroke for assuming the proper angular orientation for receiving the broaches from the adjacent pull means, said heads being responsive to return means urging them to a predetermined abutment angular position corresponding to the desired broach orientation for performing the next pass.

6. Multiple-broach broaching machine according to claim 1, wherein said pull and follower means are horizontally arranged, the plate to be broached being supported by a gantry provided with means for moving and centering the plate vertically, the gantry itself being movable on a lower rolling frame disposed across the broach axis.

7. Multiple-broach broaching machine according to claim 1, wherein the pull means of one of the pairs of broaches are supported by a frame movable parallel to the broach axis and responsive to control means for clamping, by means of a fixed frame to the other pair of broaches, the plate to be broached in the broaching position, and releasing said broach for changing its position, one of said frames comprising means for positioning said plate which are adapted to co-act with the holes to be broached therein.

* * * * *